United States Patent

Hankawa

[11] Patent Number: 5,596,386
[45] Date of Patent: Jan. 21, 1997

[54] PROJECTION AND RECEPTION TYPE FOCUS DETECTING APPARATUS

[75] Inventor: Masashi Hankawa, Hino, Japan

[73] Assignee: Olympus Optical Co., Ltd., Tokyo, Japan

[21] Appl. No.: 527,939

[22] Filed: Sep. 14, 1995

[30] Foreign Application Priority Data

Sep. 16, 1994 [JP] Japan .................................. 6-221509

[51] Int. Cl.⁶ ...................................................... G03B 3/00
[52] U.S. Cl. ........................ 396/110; 356/3.01; 250/201.6
[58] Field of Search ......................... 354/403; 250/201.4, 250/201.6; 356/3.01

[56] References Cited

U.S. PATENT DOCUMENTS

| | | | |
|---|---|---|---|
| Re. 27,461 | 8/1972 | Harvey | 354/403 |
| 3,435,744 | 4/1969 | Stimson | 354/403 |
| 3,442,193 | 5/1969 | Pagel | 354/403 |
| 3,443,502 | 5/1969 | Harvey | 354/403 |
| 3,618,499 | 11/1971 | Harvey | 354/403 |
| 4,571,048 | 2/1986 | Sugawara | 354/403 |
| 4,648,700 | 3/1987 | Nagaoka | 354/403 |
| 4,827,303 | 5/1989 | Tsuboi | 354/403 |
| 4,876,565 | 10/1989 | Tusting | 354/403 |
| 5,056,914 | 10/1991 | Kollodge | 356/5 |
| 5,225,876 | 7/1993 | Lux et al. | 354/403 |
| 5,270,765 | 12/1993 | Kunishige | 354/403 |
| 5,274,429 | 12/1993 | Misawa et al. | 356/1 |
| 5,341,186 | 8/1994 | Kato | 354/403 |

FOREIGN PATENT DOCUMENTS

| | | |
|---|---|---|
| 58-93040 | 11/1981 | Japan . |
| 61-88211 | 10/1984 | Japan . |

*Primary Examiner*—Michael L. Gellner
*Assistant Examiner*—Eric Nelson
*Attorney, Agent, or Firm*—Cushman, Darby & Cushman IP Group of Pillsbury Madison & Sutro LLP

[57] ABSTRACT

A projection and reception type focus detecting apparatus, which is capable of making the range measurement in plural regions, includes a light source for illuminating an object with a beam of light, a projection optical system, a reception optical system, and a scanning device for scanning with the light beam or emitting pulses in a scanning mode when the object is illuminated with the light beam, satisfying the condition:

$$0.09 < l/f < 0.23$$

where l is the maximum distance from the intersection of the exit surface of the light source with the optical axis of the projection optical system to the end of the exit surface of the light source and f is the focal length of the projection optical system.

14 Claims, 6 Drawing Sheets

PROJECTION AND RECEPTION TYPE FOCUS DETECTING APPARATUS

BACKGROUND OF THE INVENTION

1. Field of the Invention

This invention relates to a focus detecting apparatus which is mounted In a camera or the like.

2. Description of Related Art

In the past, many of the so-called projection and reception type focus detecting apparatus have been known in which a beam of light emitted from a light source is projected toward an object and reflected light from the object is received to thereby measure a distance to the object. In particular, a technique called a multipoint range measurement is being chiefly used in which distances to plural points on the object are measured over a wide area to derive the information of a range measurement therefrom so that what is called an object omission is prevented.

Although this technique brings about appreciable results, most of the projection and reception type focus detecting apparatus chiefly used at present are such that an IRED (infrared-emitting diode) is used in the light source to measure distances to three to five points on the object. With such an apparatus, when a zoom lens markedly changing a field angle is used, it is difficult to make the range measurement most suitable for preventing the object omission in the range of variable magnification from a wide angle to a telephoto position.

In addition, another technique of radiating light beams from some light sources toward the object at the same time has the defect that the intensity distribution of reflected light from the object by respective beams is liable to overlap as the number of focus detecting points is increased, and precise range measurements cannot be made.

In recent years, to obviate this defect, techniques, such as those set forth In Japanese Patent Preliminary Publication Nos. Sho 58-93040 and Sho 61-68221 and Japanese Patent Publication No. Hei 1-57891, have been proposed. These techniques are such that the surface of the object is scanned with a projected beam of light to allow the range measurement in a wider area. Any of the techniques, however, requires a large-scale device for moving the light source itself or rotating a projection unit or the whole of a projection and reception unit.

SUMMARY OF THE INVENTION

It is, therefore, an object of the present invention to provide a projection and reception type focus detecting apparatus which is constructed so that the information of a range measurement can be derived from more focus detecting points and the driving mechanism of a scanning device is relatively simple and compact.

To achieve this object, the projection and reception type focus detecting apparatus according to the present invention is capable of making the range measurement in plural regions, and includes, at least, a light source for illuminating an object with a beam of light, a projection optical system, a reception optical system, and a scanning device for scanning with the light beam or emitting pulses in a scanning mode when the object is Illuminated with the light beam, satisfying the condition:

$$0.09 < l/f < 0.23 \quad (1)$$

where l is the maximum distance from the intersection of the exit surface of the light source with the optical axis of the projection optical system to the end of the exit surface of the light source and f is the focal length of the projection optical system.

Further, the projection and reception type focus detecting apparatus of the present invention constructed as mentioned above includes an optical system which is capable of scanning with a projected beam in a direction different from that of movement of the scanning device. The scanning device is provided with a member having at least one aperture.

Still further, the projection and reception type focus detecting apparatus is capable of making the range measurement in plural regions, and includes a light source for illuminating an object with a beam of light, a member having an aperture for limiting the size of a beam of light, a projection optical system, and a reception optical system.

This and other objects as well as the features and advantages of the present invention will become apparent from the following detailed description of the preferred embodiments when taken in conjunction with the accompanying drawings.

DETAILED DESCRIPTION OF THE PREFERRED EMBODIMENTS

Figure 1:
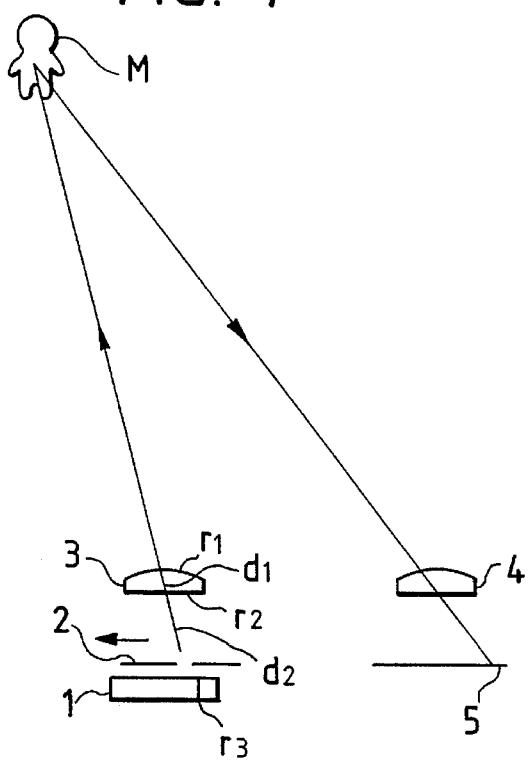
FIG. 1 is a view showing an optical arrangement in a first embodiment of the projection and reception type focus detecting apparatus according to the present invention.

Before undertaking the description of the embodiments, it will be expedient to explain the principle of the projection and reception type focus detecting apparatus according to the present invention.

The apparatus of the present invention can use a light source, such as a xenon tube employed, for example, in a stroboscope, having some length in a scanning direction, as well as a conventional light source such as an IRED. The apparatus of the present invention is designed so that light emitted from the light source is blocked by a member having a small aperture and the member is moved, thereby allowing the surface of an object to be scanned with a beam of light passing through the aperture. In this case, the member may employ a mask or any other means if it has the same function as the mask. A light-detecting element is spaced by a base length from this projection means and receives reflected light from the object to calculate the distance to the object in accordance with a signal obtained by photoelectric conversion.

In this way, only by moving a small mask without moving the light source or parts which are large in size and heavy in weight, such as lenses constituting the projection optical system, the surface of the object can easily be scanned with a projected beam radiated toward the object. Theoretically, the number of focus detecting points can be increased at will.

Eq. (1) mentioned above defines the half field angle of the projection optical system. If the value of I/f is below the lower limit of Eq. (1), the field angle of projection becomes smaller and a focus detecting area becomes narrower. This fails to bring about the effect of the multipoint range measurement. If, on the other hand, the value of I/f exceeds the upper limit of Eq. (1), an oversizing of the projection optical system will be caused in order to maintain the specification and performance of the apparatus of the present invention. This situation is improper to the camera which requires compact design.

Where the focus detecting apparatus is mounted in a camera and uses a light source, such as a xenon tube, having some degree of length, the orientation of the arrangement of the apparatus sometimes produces a large effect on compact design of the camera. Thus, according to the present invention, an optical system is provided which is capable of scanning with a projected beam in a direction different from that of movement of the scanning device for the mask. Consequently, when the projection and reception type focus detecting apparatus of the present invention is loaded in a camera, the number of degrees of layout freedom is increased and compact design can be derived.

In the apparatus of the present invention, the light source is disposed in a direction normal to the object so that a beam of light of the projection optical system is bent twice by a mirror and a prism, and the surface of the object is scanned horizontally with a projected beam to thereby allow the compactness of the camera with respect to the projection optical system.

Furthermore, in the apparatus of the present invention, the scanning device, equipped with a member having at least one aperture, is capable of scanning with a projected beam emitted toward the object or emitting pulses in a scanning mode. Since the apparatus is simply constructed, its compact design and lightweight can be secured.

The member having the aperture is designed so that when the object is Illuminated with a light beam, plural areas to be measured are illuminated in arbitrary order. In this way, the light beam is radiated toward the areas of the object in arbitrary order, and thereby the range measurement can be made in order from an focus detecting area most important for photography.

Aspherical surfaces are used in an optical member constituting the projection optical system, and thereby a good spot image can be obtained in a wide scanning range. In order to secure a better projected spot, it is desirable that a lens member, closest to the light source, of lenses constituting the projection optical system is constructed with a positive meniscus lens directing its concave toward the light source.

In accordance with the embodiments shown in the drawings, the present invention will be explained in detail below.

First Embodiment

In the apparatus of this embodiment, as shown in FIG. 1, rays of light emitted from a light source 1 pass through the aperture of a mask 2 disposed in front of the light source 1 (on the upper side in the figure), and a resulting light beam is radiated toward an object M, as a projected beam of light with the diameter of predetermined size, by a projection optical system 3 located in front of the mask 2. Subsequently, reflected light from the object M falls, through a reception optical system 4, on a light-detecting element 5 disposed behind the reception optical system 4. In this case, the light-detecting element 5 photoelectrically converts received light into an electrical signal, which is sent to arithmetic processing means, not shown. In the arithmetic processing means, a calculation on the so-called trigonometrical range finding technique is performed to measure the distance to the object M. The apparatus of the first embodiment is designed so that the number of focus detecting points is not necessarily limited to one, and if the mask 2 is moved in a horizontal direction as indicated by an arrow in the figure, the surface of the object can be scanned with the projected beam radiated toward the object M, and thus the number of focus detecting points can be arbitrarily increased within this scanning range. Also, the projection optical system 3 used in the apparatus of the first embodiment is constructed with a single biconvex lens.

Figure 2:
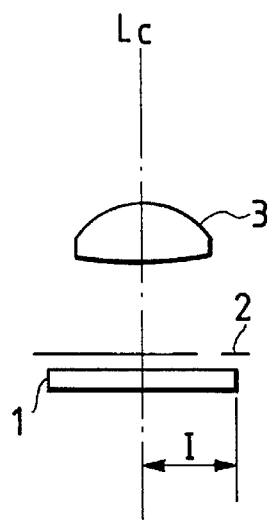
FIG. 2 is an enlarged view showing a projection optical system in the arrangement of FIG. 1.

The light source 1 used in the first embodiment, as depicted in FIG. 2, has some degree of length in any direction. Hence, in order to make a good range measurement while moving the mask 2 in a horizontal direction, it is necessary to ensure, to some extent, the distance from the intersection of the exit surface of the light source 1 with an optical axis Lc of the projection optical system 3 to the end of the exit surface of the light source 1. For this purpose, in terms of the relationship between the maximum distance I and the focal length f of the projection optical system 3, Eq. (1) must be satisfied.

The numerical data of the lens of the projection optical system mounted in the apparatus of the first embodiment is shown below.

Maximum distance I from the intersection of the exit surface of the light source 1 with the optical axis of the projection optical system 3 to the end of the exit surface of the light source 1=1, Focal length f of the projection optical system 3=7.992, Eq. (1), I/f=0.125, Numerical aperture NA of the projection optical system 3=0.25

$r_1 = 4.93429$
$\quad d_1 = 2.200000 \quad n_1 = 1.51633$
$r_2 = -21.38448$
$\quad d_2 = 6.786883$
$r_3 = \infty$

Second Embodiment

Figure 3:
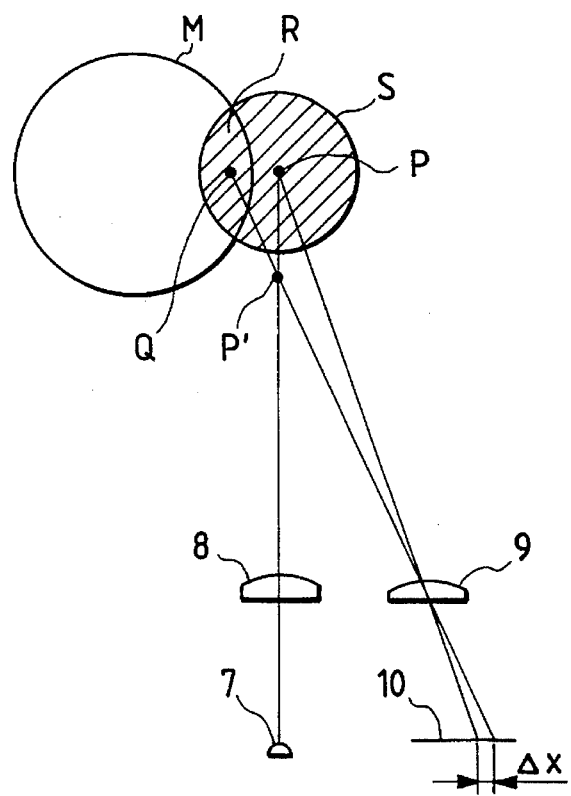
FIG. 3 is a view for explaining a trigonometrical range finding technique in the projection and reception type focus detecting apparatus.

Referring now to FIG. 3, prior to the description of this embodiment, the trigonometrical range finding technique where the number of reception systems is one will be explained. As shown in the figure, where a projected beam (spot) is shifted from the object M and a part of a radiated area S (a hatching portion in the figure) of the projected beam is superimposed on the object M, the area of overlapping is represented by R. Although a beam of light emitted from a light source 7 illuminates the area S through a projection optical system 8, only the portion of the area R is actually illuminated on the object M, and hence reflected light will come from only the portion of the area R. This situation is usually called "spot eclipse", and when the spot eclipse is produced, only the reflected light from the area R will fall, through a reception optical system 9, on a receiving surface 10 of the light-detecting element. Consequently, compared with the case where the spot eclipse is not produced, a receiving position of the reflected light on the receiving surface 10, as shown in the figure, is shifted by $\Delta x$. If such a case occurs, the calculation will be performed in which a center Q of the area R is regarded as a center P of the area S, and as a result, an erroneous range measurement will be made as though the object M were located at the position of a point P'.

In order to obviate the erroneous range measurement caused by the spot eclipse, it is only necessary to provide the focus detecting apparatus with at least two reception systems. The projection and reception type focal detecting apparatus according to the second embodiment is thus provided with two reception systems.

Figure 4:
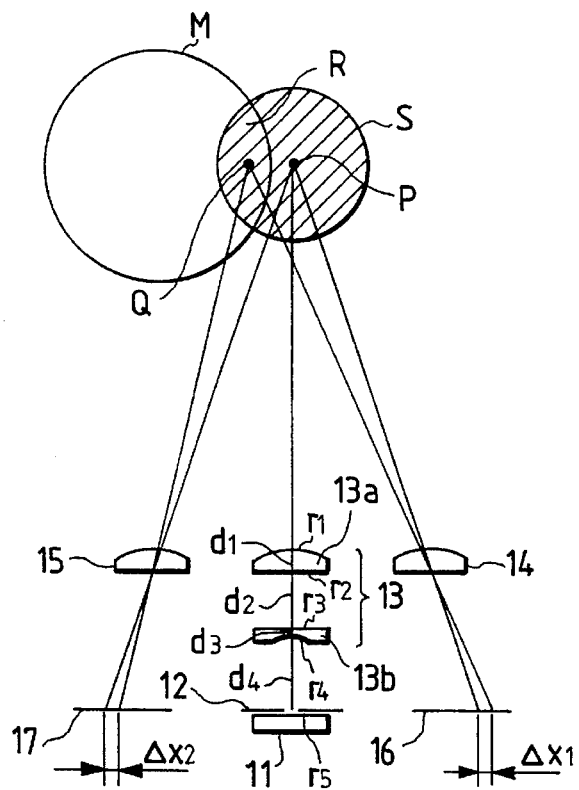
FIG. 4 is a view showing an optical arrangement of a second embodiment in the present invention.

The apparatus of the second embodiment, as shown in FIG. 4, has a first reception system including a reception optical system 14 and a second reception system including a reception optical system 15. In this figure also, the spot eclipse, such as that shown in FIG. 3, is produced. Here, $\Delta x1$ is taken as the shift between the incidence position of reflected light from the area R transmitted through the reception optical system 14 and entering a receiving surface 16 of a light-detecting element and the incidence position in the case where the spot eclipse is not produced, and $\Delta x2$ is taken as the shift between the incidence position of reflected light from the area R transmitted through the reception optical system 15 and entering a receiving surface 17 of another light-detecting element and the incidence position in the case where the spot eclipse is not produced. In this case, the apparatus of the second embodiment, which has two reception systems, is designed so that the calculation result based on the shift $\Delta x1$ of the incidence position is compared with that based on the shift $\Delta x2$, and thereby a contradiction between two measured values can be detected. In this way, the production of the spot eclipse can be found and the erroneous range measurement can be corrected. It is a matter of course that the apparatus of the second embodiment, like the first embodiment, is also provided with the arithmetic processing means, not shown, and the range measurement is made by the same processing as in the first embodiment.

In addition, the measurement by outputs from the two reception systems based on a calculating technique using the fact that the value of $\Delta x1+\Delta x2$ is nearly constant according to the distance to the object can be performed by another calculating technique different from the foregoing. The provision of two light-detecting elements makes it possible to keep the erroneous range measurement to a minimum, even though an error is made in the movement of the mask 12.

A projection optical system 13 mounted in the apparatus of the second embodiment is constructed, in order from the object side, with a biconvex lens 13a having both aspherical surfaces and a positive meniscus lens 13b directing its concave toward a light source 11 in order to scan the object with the projected spot in a relatively wide range.

The numerical data of lenses of the projection optical system mounted in the apparatus of the second embodiment is shown below.

Maximum distance I from the Intersection of the exit surface of the light source 11 with the optical axis of the projection optical system 13 to the end of the exit surface of the light source 11=2.1, Focal length f of the projection optical system 13=9.994, Eq. (1), I/f=0.210, Numerical aperture NA of the projection optical system 13=0.39170

$r_1 = 7.89259$ (aspherical)
$\quad d_1 = 4.600000 \quad n_1 = 1.51633$
$r_2 = -82.50735$ (aspherical)
$\quad d_2 = 7.354679$
$r_3 = 3.75341$
$\quad d_3 = 2.559259 \quad n_3 = 1.51633$
$r_4 = 5.44212$
$\quad d_4 = 0.999916$
$r_5 = \infty$ Aspherical coefficients First surface
$\quad K = -0.617535, A = -0.722026 \times 10^{-4}$
Second surface
$\quad K = -73.395359, A = -0.734719 \times 10^{-4}$

Third Embodiment

Figure 5:
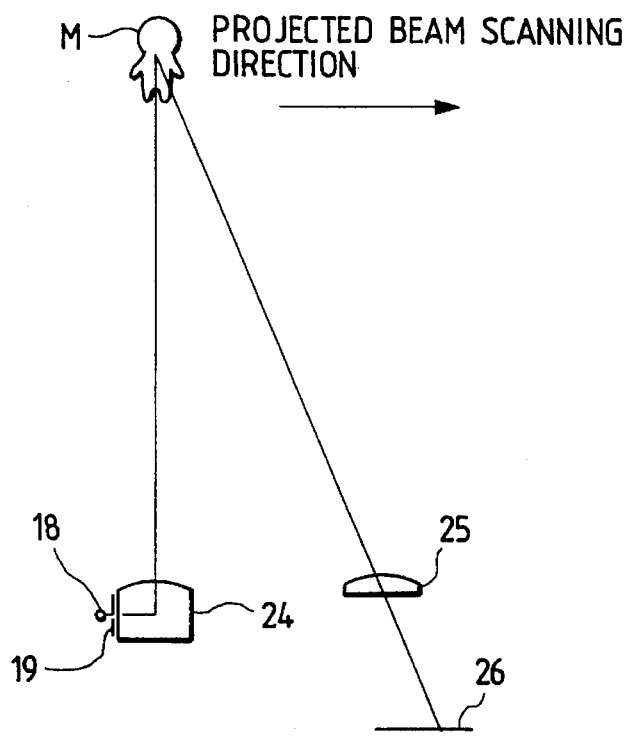
FIG. 5 is a view showing an optical arrangement of a third embodiment in the present invention.

The apparatus of this embodiment, as shown in FIG. 5, is such that a ray of light emitted from a light source 18 passes through the aperture of a mask 19 moving perpendicular to the plane of the figure and illuminates the object M through a projection optical system 24 capable of changing the scanning direction. Reflected light from the object M traverses a reception optical system 25 to fall on a receiving surface 26 of the light-detecting element.

Figure 6:
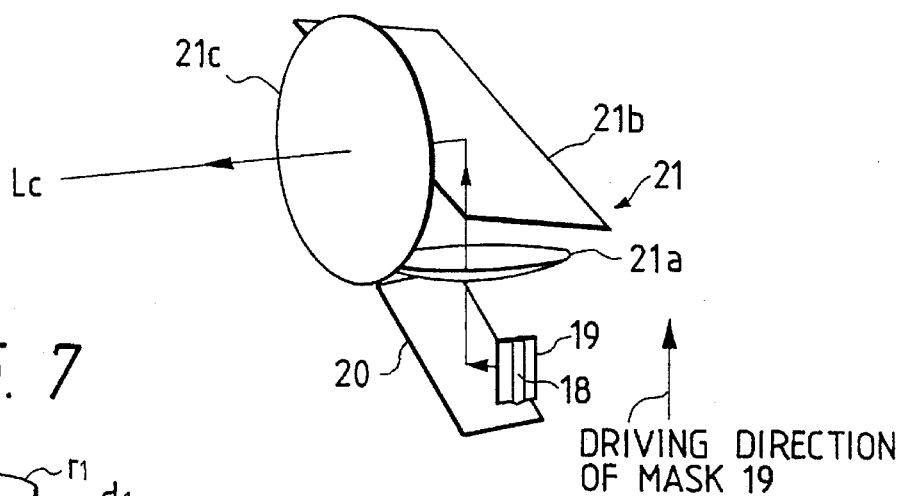
FIG. 6 is an enlarged perspective view showing the projection optical system in the arrangement of FIG. 5.

More specifically, as shown in FIG. 6, the ray emitted from the light source 18 travels through the aperture of the mask 19 and is reflected by a mirror 20. This reflected light is transmitted through an entrance surface 21a of a prism 21, internally reflected by a reflecting surface 21b of the prism 21, and radiated through an exit surface 21c of the prism 21 toward the object, not shown. The prism 21 has a refracting power and functions as the projection optical system.

The projection optical system 24 in the apparatus of the third embodiment is constructed as in the foregoing, and thus if the orientations of the mirror 20 and the prism 21 are changed, the object can be scanned in a direction different from that of the movement of the mask 19. Also, the entrance surface 21a and the exit surface 21c of the prism 21 are both configured as aspherical surfaces.

The third embodiment, like the first embodiment, is also provided with the arithmetic processing means, not shown, so that the light-detecting element photoelectrically converts received light into an electrical signal, which is sent to arithmetic processing means. In the arithmetic processing means, a calculation on the so-called trigonometrical range finding technique is performed to measure the distance to the object M.

Figure 7:
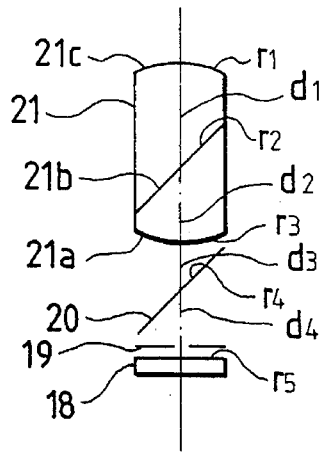
FIG. 7 is a view showing the arrangement, developed along the optical axis, of the optical system of FIG. 6.

The following is the numerical data of parts of the projection optical system mounted in the apparatus of the third embodiment (refer to FIG. 7).

Maximum distance I from the intersection of the exit surface of the light source 18 with the optical axis of the projection optical system 24 to the end of the exit surface of the light source 18=2.1, Focal length f of the projection optical system 24=19.972, Eq. (1), I/f=0.105, Numerical aperture NA of the projection optical system 24=0.39170, Reflection angle of the reflecting surface 21b of the prism 21=45°, Reflection angle of the mirror 20=45°

---

$r_1 = 14.53313$ (aspherical)
  $d_1 = 12.000000$   $n_1 = 1.49241$
$r_2 = \infty$
  $d_2 = 9.000000$   $n_2 = 1.49241$
$r_3 = -15.91538$ (aspherical)
  $d_3 = 5.500000$
$r_4 = \infty$
  $d_4 = 5.000000$
$r_5 = \infty$

---

Aspherical coefficients

First surface
  $K = -0.99906, A = -0.312384 \times 10^{-5}$
Third surface
  $K = 1.563531, A = -0.195972 \times 10^{-3}$

---

Fourth Embodiment

Figure 8:
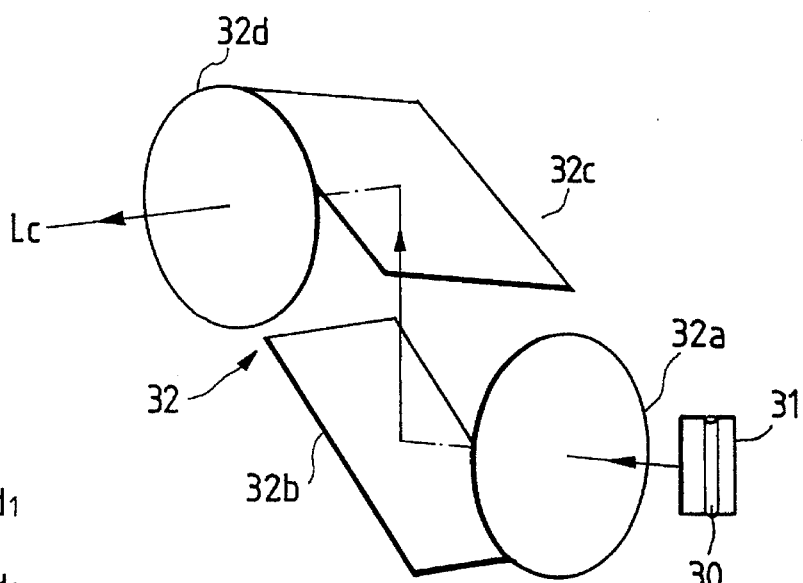
FIG. 8 is a perspective view showing the arrangement of the projection optical system of a fourth embodiment in the present invention.

In the projection optical system of this embodiment, as shown in FIG. 8, a ray of light emitted from a light source 30 first traverses the aperture of a mask 31 and is transmitted through an entrance surface 32a of a prism 32. This transmitted light is reflected in turn by reflecting surfaces 32b and 32c of the prism 32 to illuminate the object, not shown, through an exit surface 32d of the prism 32. The prism 32 has a refracting power and functions as the projection optical system. The entrance surface 32a and the exit surface 32b of the prism 32 are both configured as aspherical surfaces.

Also, means for receiving the reflected light from the object and the arithmetic processing technique of received information are identical with those of the third embodiment.

Even with the apparatus of the fourth embodiment constructed as mentioned above, the use of the prism 32 makes it possible to scan the object in a direction different from that of the movement of the mask 31.

Figure 9:
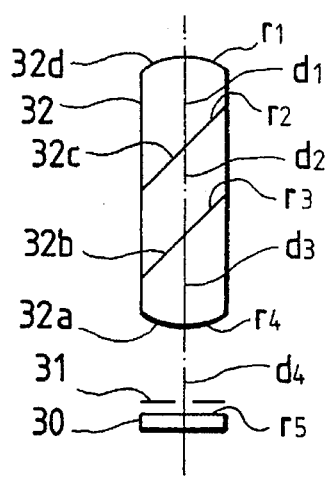
FIG. 9 is a view showing the arrangement, developed along the optical axis, of the optical system of FIG. 8.

The following is the numerical data of parts of the projection optical system mounted in the apparatus of the fourth embodiment (refer to FIG. 9).

Maximum distance I from the intersection of the exit surface of the light source 30 with the optical axis of the projection optical system to the end of the exit surface of the light source 30=2.1, Focal length f of the projection optical system=19.952, Eq. (1), I/f=0.105, Numerical aperture NA of the projection optical system= 0.2, Reflection angle of the reflecting surface 32b of the prism 32=45°, Reflection angle of the reflecting surface 32c of the prism 32=45°

---

$r_1 = 16.58602$ (aspherical)
  $d_1 = 10.000000$   $n_1 = 1.492410$
$r_2 = \infty$
  $d_2 = 10.000000$   $n_2 = 1.492410$
$r_3 = \infty$
  $d_3 = 10.000000$   $n_3 = 1.492410$
$r_4 = -9.71778$ (aspherical)
  $d_4 = 8.094820$
$r_5 = \infty$

---

Aspherical coefficients

First surface
  $K = 0.953790, A = -0.501520 \times 10^{-4}$
Fourth surface
  $K = -1.125924, A = 0.269181 \times 10^{-3}$

---

Fifth Embodiment

Figure 10:
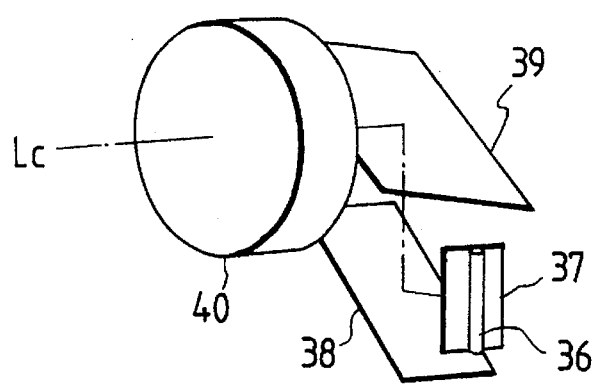
FIG. 10 is a perspective view showing the arrangement of the projection optical system of a fifth embodiment in the present invention.

The projection optical system of this embodiment, as depicted in FIG. 10, is such that a ray of light emitted from a light source 36 passes through the aperture of a mask 37 and is reflected in turn by mirrors 38 and 39 to illuminate the object, not shown, through a lens 40. In the apparatus of the fifth embodiment, the mirrors 38 and 39 are arranged as in the figure, and thus if the orientations of the mirrors are changed, the object can be scanned in a direction different from that of the movement of the mask 37.

Also, means for receiving the reflected light from the object and the arithmetic processing technique of received information are Identical with those of the third embodiment.

Figure 11:
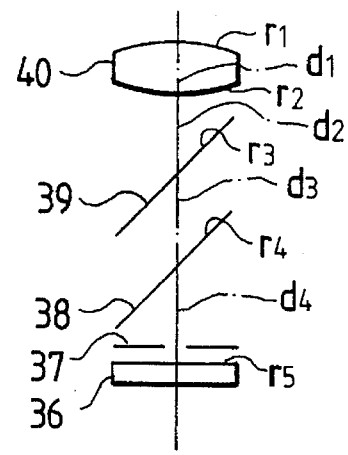
FIG. 11 is a view showing the arrangement, developed along the optical axis, of the optical system of FIG. 10.

The following is the numerical data of the projection lens system mounted in the apparatus of the fifth embodiment (refer to FIG. 11).

Maximum distance I from the intersection of the exit surface of the light source 36 with the optical axis of the projection optical system to the end of the exit surface of the light source 36=2.1, Focal length f of the projection optical system=19.952, Eq. (1), I/f=0.105, Numerical aperture NA of the projection optical system= 0.2, Reflection angle of the mirror 38=45°,
Reflection angle of the mirror 39=45°

---

$r_1 = 12.66802$ (aspherical)
 $d_1 = 4.400000$    $n_1 = 1.516330$
$r_2 = -48.63418$ (aspherical)
 $d_2 = 6.000000$
$r_3 = \infty$
 $d_3 = 7.000000$
$r_4 = \infty$
 $d_4 = 4.642407$
$r_5 = \infty$

---

Aspherical coefficients

First surface
 $K = -0.765426, A = -0.739209 \times 10^{-4}$
Second surface
 $K = 58.503617, A = 0.185730 \times 10^{-4}$

---

In the above embodiments, $r_1, r_2, \ldots$ represent radii of curvature of individual lens or prism surfaces, or other optical surfaces; $d_1, d_2, \ldots$ thicknesses of individual lenses or prisms, or spaces therebetween; $n_1, n_2, \ldots$ refractive indices of individual lenses or prisms; $K$ denotes the conic constant; and $A$ denotes the aspherical coefficient.

Also, the configurations of aspherical surfaces in the above embodiments are expressed by the following equation using the aspherical coefficient:

$$Z = \frac{Y^2/r}{\sqrt{1-(1+K)(Y/r)^2}} + AY^4$$

where $Z$ represents the coordinates in the direction of the optical axis and $Y$ represents the coordinates in the direction normal to the optical axis.

Next, reference is made to various techniques for scanning the surface of the object with the projected beam in the apparatus of the present invention.

Figure 12:
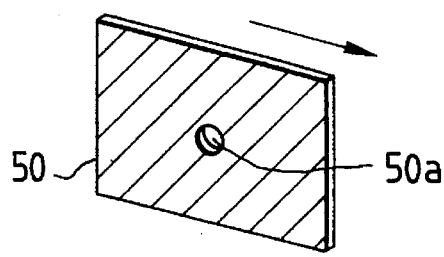
FIG. 12 is a view showing an example of a mask having an aperture for scanning the surface of the object with a projected beam in the present invention.

FIG. 12 shows a technique for moving a mask 50 with an aperture 50a in the direction of an arrow to thereby scan the surface of the object with a beam of light passing through the aperture 50a.

Figure 13:
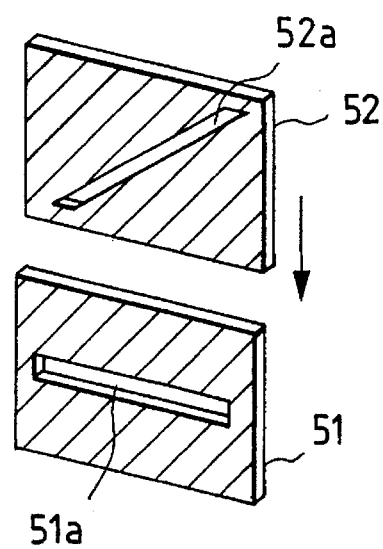
FIG. 13 is a view showing an example of a mask set having apertures for scanning the surface of the object with the projected beam.

FIG. 13 illustrates a technique that a mask 51 with a laterally extended aperture 51a is placed on a mask 52 with a diagonally cut aperture 52a, and the mask 52 is slid vertically (in the direction of an arrow in the figure) with respect to the mask 51 so that the surface of the object is scanned with a projected beam emerging from the portion where the apertures 51a and 52a overlap. This technique, compared with the case of the mask 50 shown in FIG. 12, requires a smaller amount of movement of the mask.

Figure 14:
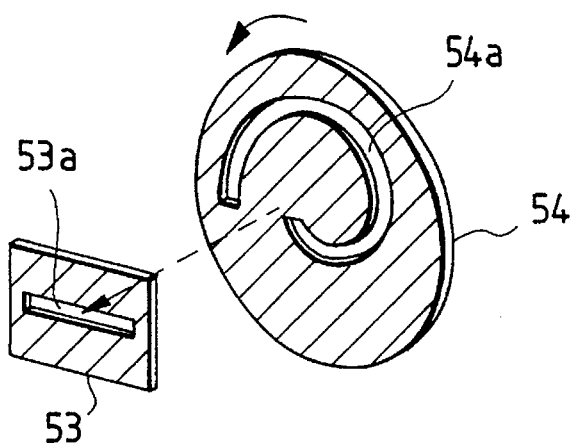
FIG. 14 is a view showing another example of the mask set.

FIG. 14 shows a technique that a mask 53 having a laterally extended aperture 53a is placed on a mask 54 having a spiral aperture 54a, and the mask 54 is rotated in the direction of a solid arrow in the figure so that the surface of the object is scanned with a projected beam emerging, as indicated by a broken arrow in the figure, from the portion where the apertures 53a and 54a overlap. This technique, unlike that of FIG. 12 or 13, does away with the need for reciprocating the mask laterally or vertically, and thus the driving mechanism of the mask can be simplified.

Figure 15:
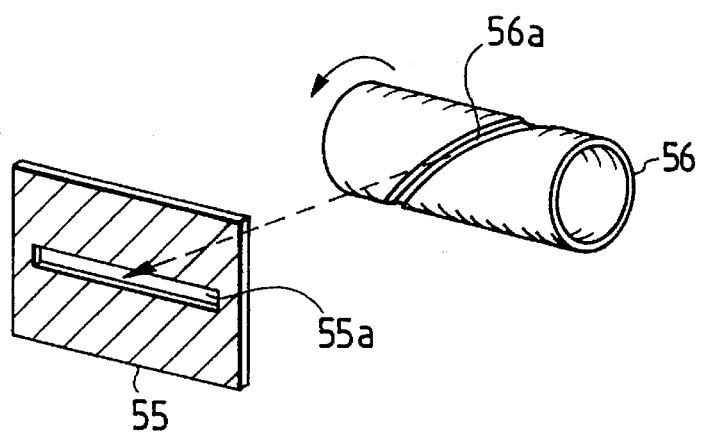
FIG. 15 is a view showing still another example of the mask set.

FIG. 15 shows a technique that a cylindrical mask 56 inside which a light source, not shown, is provided, having an aperture 56a, is placed behind a mask 55 having a laterally extended aperture 55a, and is rotated in the direction of a solid arrow so that the surface of the object is scanned with a projected beam emerging, as indicated by a broken arrow, from the portion where the apertures 55a and 56a overlap. In this technique also, unlike that of FIG. 12 or 13, the mask need not be reciprocated laterally or vertically, and thus the driving mechanism of the mask can be simplified. Moreover, compared with the case of FIG. 14, the peripheral area of the mask is made compact. If a reflecting surface is constructed of a mirror coating inside the cylindrical mask 56, light from the light source can be effectively emitted toward the object.

Figure 16:
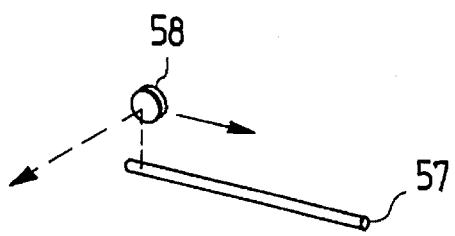
FIG. 16 is an explanatory view of a technique for scanning the surface of the object with the projected beam.

FIG. 16 illustrates a technique that light from a light source 57 is reflected by a small mirror 58, which is moved in the direction of a solid arrow to thereby bring about the same effect as the case where the above masks are used.

Figure 17:
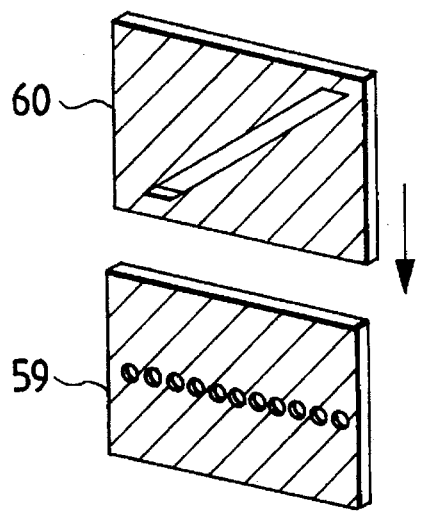
FIG. 17 is a view showing an example of a mask set having apertures for emitting pulses with the projected beam toward the object.

FIG. 17, similar to FIG. 13, shows a technique that a mask 59 is placed on a mask 60, which is slid vertically, as indicated by an arrow, with respect to the mask 59. This technique, however, is different from that of FIG. 13 in that the mask 59 has apertures composed of a plurality of small holes arranged in a line, and when the mask 59 is placed on the mask 60, a ray of light emerging from the portion where their apertures overlap is such as not to scan, but to emit pulses in a scanning mode.

Figure 18:
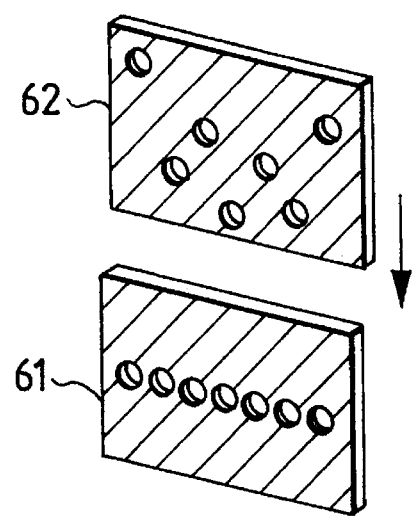
FIG. 18 is a view showing a modification of the mask set of FIG. 17.
Figure 19:
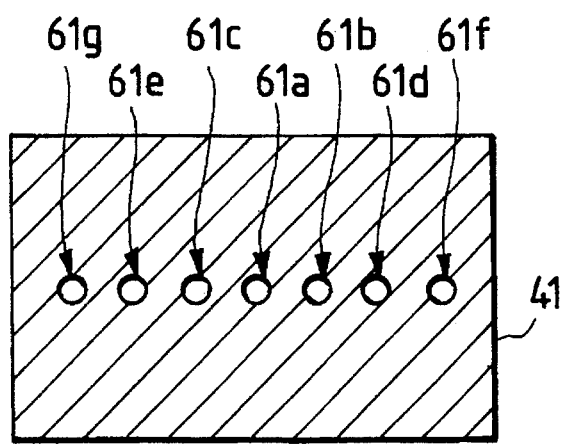
FIG. 19 is a front view showing one mask of the mask set of FIG. 18.

FIG. 18 shows the modification of FIG. 17. A mask 62 has apertures whose positions are slightly shifted to one another and is slid vertically, as indicated by an arrow, with respect to the mask 61 so that light emerges in order from any portion where its apertures overlap. FIG. 19 is a front view of the mask 61. By sliding downward the mask 62 shown in FIG. 18, the light can be emitted in order of apertures 61a, 61b, 61c, 61d, 61e, 61f, and 61g.

Figure 20:
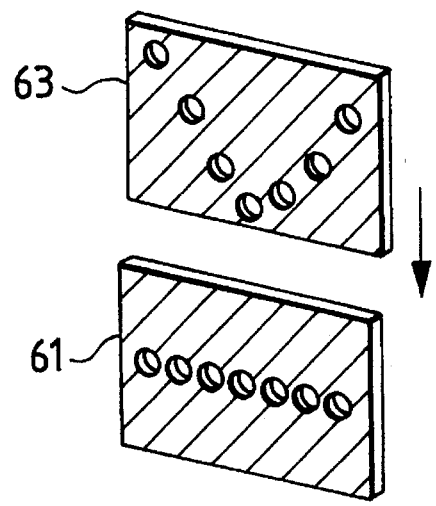
FIG. 20 is a view showing a modification of the mask set of FIG. 18.

As illustrated in FIG. 20, even when the apertures of a mask 63 are provided, the mask 63 is slid in the direction of an arrow with respect to the mask 61 as in FIG. 18, and thereby light can be emitted in order of apertures 61a, 61b, 61c, 61d, 61e, 61f, and 61g.

According to FIGS. 17 to 20, pulses can be emitted in a scanning mode in order from the middle of an object having the highest possibility for photography toward the left and right of the object. Hence, when a decision has been made that rays can be brought to a focus at the middle of the object only by measuring the distance to the middle of the object, a further step can be taken immediately without illuminating the other area of the object with the projected beam, and thus a time lag to photography can be diminished.

The scanning techniques by the projected beam explained in reference to FIGS. 12 to 20 are applicable to any of the above embodiments. Thus, in the apparatus of the present invention, the most suitable one of the above scanning techniques can be selectively used according to objects, arrangements, or other conditions.

What is claimed is:

1. A projection and reception type focus detecting apparatus for making a range measurement in a plurality of regions, comprising:

a light source for emitting a beam of light;

a projection optical system for illuminating an object with the beam of light from said light source as a projected beam;

a reception optical system for receiving reflected light from the object to fall on a light-detecting element; and scanning means for scanning a surface of the object with the projected beam or emitting pulses in a scanning mode when the object is illuminated with the projected beam, satisfying the condition:

$$0.09 < I/f < 0.23$$

where I is a maximum distance from an intersection of an exit surface of said light source with an optical axis of said projection optical system to an end of the exit surface of said light source and f is a focal length of said projection optical system.

2. A projection and reception type focus detecting apparatus according to claim 1, further comprising an optical system for scanning the surface of the object with the projected beam in a direction different from a direction of movement of said scanning means.

3. A projection and reception type focus detecting apparatus according to claim 1, wherein said scanning means includes a member having at least one aperture.

4. A projection and reception type focus detecting apparatus for making a range measurement in a plurality of regions, comprising:

a light source for emitting a beam of light;

a member having apertures for limiting a size of the beam of light;

a projection optical system for illuminating an object with the beam of light from said light source as a projected beam; and a reception optical system for receiving reflected light from the object to fall on a light-detecting element;

said member having apertures being constructed so that when the object is illuminated with the beam of light, said plurality of regions to be measured are illuminated in arbitrary order.

5. A projection and reception type focus detecting apparatus according to claim 2, further comprising means for reflecting, at least twice, the beam of light emitted from said light source.

6. A projection and reception type focus detecting apparatus according to claim 2, wherein said projection optical system includes at least two mirrors.

7. A projection and reception type focus detecting apparatus according to claim 2, wherein said projection optical system includes a prism having at least two reflecting surfaces.

8. A projection and reception type focus detecting apparatus according to claim 2, wherein said projection optical system includes at least one mirror and a prism having at least one reflecting surface.

9. A projection and reception type focus detecting apparatus according to claim 2, wherein said reception optical system includes at least two systems.

10. A projection and reception type focus detecting apparatus according to claim 3, wherein two members, each having at least one aperture, are superposed to operate so that the surface of the object is scanned with light emerging from a portion where apertures of said two members overlap.

11. A projection and reception type focus detecting apparatus according to claim 3, wherein said scanning means includes at least two members having apertures, and one of said at least two members is configured as cylindrical member, inside which said light source is placed, said cylindrical member being rotated so that the surface of the object is scanned with light emerging from a portion where the apertures of said at least two members overlap.

12. A projection and reception type focus detecting apparatus according to claim 3, wherein the light emitted from said light source is reflected by a reflecting member, and the surface of the object is scanned with the projected beam by moving said reflecting member.

13. A projection and reception type focus detecting apparatus according to claim 4, wherein the surface of the object is scanned with the projected beam in order from a middle of the object toward a periphery thereof.

14. A projection and reception type focus detecting apparatus according to claim 4, satisfying a condition:

$$0.09 < I/f < 0.23$$

where I is a maximum distance from an intersection of an exit surface of said light source with an optical axis of said projection optical system to an end of the exit surface of said light source and f is a focal length of said projection optical system.

* * * * *